United States Patent [19]

Mao

[11] Patent Number: 5,668,989
[45] Date of Patent: Sep. 16, 1997

[54] TWO-DIGIT HYBRID RADIX YEAR NUMBERS FOR YEAR 2000 AND BEYOND

[76] Inventor: Decao Mao, 19 Orchard Hill Rd., Newtown, Conn. 06470

[21] Appl. No.: 715,616

[22] Filed: Sep. 18, 1996

[51] Int. Cl.$^6$ .............................. G06F 3/023; G06F 9/30
[52] U.S. Cl. .................. 395/612; 395/705; 395/704; 364/771; 364/744; 341/82; 341/83; 341/84; 341/85; 705/25
[58] Field of Search .................................. 395/612, 225, 395/704, 705; 341/83, 84, 85, 88, 82; 364/744, 771

[56] References Cited

U.S. PATENT DOCUMENTS

| | | | |
|---|---|---|---|
| 3,159,740 | 12/1964 | Broce | 235/169 |
| 3,748,450 | 7/1973 | Fico | 341/88 |
| 3,809,872 | 5/1974 | Yamamura et al. | 235/170 |
| 4,342,027 | 7/1982 | Hanson | 341/84 |
| 4,792,793 | 12/1988 | Rawlinson et al. | 341/89 |
| 5,600,836 | 2/1997 | Alter | 395/612 |

OTHER PUBLICATIONS

Zvegintzov, N. "The Year 2000 as racket and Ruse." American Programmer, Feb. 1996, vol. 9, No. 2, pp. 16–19.
Hart, et al. "A Scaleable, Automated Process for Year 2000 System Correction", Software Engineering Int'l Conf. 1996, pp. 475–484.
McCabe, T. "Cyclomatic Complexity and the Year 2000" IEEE Software, vol. 13, Issue 3, May 1996, pp. 115–117.
Glass, R. L. "The Next Date Crisis and the Ones After That" Communications of the ACM, vol. 40, No. 1, Jan. 1997, pp. 15–17.
Jerome T. Murray et al.: "The Year 2000 Computing Crisis", McGraw–Hill, 1996.
http://www.software.ibm.com/year2000/faq.html, "Frequently asked questions about the year 2000 challenge", IBM 1995.
http://www.storage.ibm.com/storage/software/sort/srtmy-cw.htm, IBM, 1995 "Set the Century window for two–digit years".
http://www.storage.ibm.com/storage/software/sort/srt-mytr.htm, IBM, 1995 "Transform two–digit year dates to four–digit year dates".

Primary Examiner—Thomas G. Black
Assistant Examiner—Jean R. Homere

[57] ABSTRACT

A method and related input/output devices for using biased 2 digit "hybrid radix" numeric fields for inputting, generating, storing, processing, and outputting year numbers ranging from 1900 to 2059 in a data processing system. In a hybrid radix 2 digit year number, the higher digit is treated as hexadecimal, but displayed in a decimal-like style with font patterns such as 0–9 and '0–'5, while the lower digit is treated as ordinary decimal, so that the year 1900 is represented and processed as 00 while the year 2000 as '00. For applications written with high level languages such as COBOL and SQL, the method can be embodied solely in the system side (compiler, other system software and/or hardware), and so that no change other than a re-compilation with a new compiler is needed for existing application software. Compatibility with existing data files and databases is automatically maintained.

8 Claims, 7 Drawing Sheets

TWO-DIGIT HYBRID RADIX YEAR NUMBERS FOR YEAR 2000 AND BEYOND

BACKGROUND OF THE INVENTION

1. Field of Invention

Most existing application software in business data processing area treat a date in a format similar to "MM/DD/YY" or "YY/DDD", using 2 digits to carry the last 2 digits of a 4 digit year number, resulting in 2 digit year numbers. For example, the year number 1996 is input, stored, processed, and displayed as "96". However, starting at year 2000, this will cause problems because "00" could be interpreted as either "1900" or "2000", and for example the length of a period from 1996 to 2000 could be negative if 96 is subtracted from 00. This problem is known as the "Year 2000 (Y2K) Problem" in the industry, and has been considered a crisis.

This invention solves the problem by changing the data input/output mechanism, the storage and processing of 2 digit numbers, such that the higher digit of a 2 digit number is treated as hexadecimal, and thus 160 (instead of 100) years can be represented with a 2 digit year number. The problem is solved solely from the system side, no change is needed for application software source code in high level languages. Year numbers beyond 1999 are still 2 digit; the displayed and printed out year numbers are decimal-like and self-explanatory. With this invention, the existing application software can continue to work after year 1999.

2. Description of Prior Art

The "Year 2000 Problem" has been noticed and considered catastrophic since 1993, but so far actually no effective and easy solution is proposed for the problem.

IBM proposed several solutions, mainly:

1) Continuing to use 2 digit year numbers with a configurable "sliding century window". For example, use numbers 60 to 99 to represent years 1960 to 1999, and 00 to 59 to represent years 2000 to 2059. While the sliding window mechanism is implemented in the system side, the application software need be modified to setup and change the window accordingly. However, for some, if not all, applications this solution is not practical, because a window of 100 years could be too small, for example it is quite possible a person born in 1920 is still alive in 2020. The existing databases and/or data files make the situation even worse, because before a window can be derided for a particular application a user has to know what is the earliest year number stored in the databases and/or data files.

2) Changing year numbers from 2 digit into 4 or 3 digit. IBM announced their new 4 digit (year number) compliant system software which will provide 4 digit year numbers to the applications, therefore newly developed application software can begin to use 4 digit year numbers. However, existing application software source code need be modified to use 4 digit year numbers before a re-compilation.

Solution solely from the system side is considered not possible. This is because the system per se, either the hardware or the software, can not distinguish which particular 2 digit field is used for a year number (and which is not). In the mean time, a 2 digit field is considered anyway too small for year numbers after 1999 if sliding century window is not used. Although theoretically the space for a 2 digit field can accommodate at least 256 states if it is used to carry a hexadecimal number, the input/output and the processing remain problems (for example, no user will accept the idea to use either "60 h" or "x'60" to represent the year 1996), and more importantly the compatibility between the new software and the existing data files and databases is a big problem.

Therefore, most efforts are focused on the application software side, and changing these 2 digit fields into 3 or 4 digit seemed to be the only practical approach. Gary D. Brown predicted in his book "Advanced ANSI COBOL with Structured Programming" (second edition, 1992, Wiley & Sons, page 371) that this would "keep thousands of maintenance programmers busy in the last year of this century". Unfortunately, the change is by no means trivial and cheap. An article on the recent (Aug. 19, 1996) issue of the Fortune magazine even referred the project to be "the biggest single information project the world has ever faced" (page 54).

There has been hot discussion on the Internet for a while on the field size changes, mainly focused on how to organize and implement such a project. Some companies announced computer tools to scan application software source codes, single out these 2 digit fields and change them "automatically" based on some pattern-matching or rule-based analysis.

However, the enforcement of such changes is not only expensive, but also dangerous. There is no systematic way which can guarantee that all appropriate 2 digit fields can be singled out and changed, no matter by human or by some computer tools. Furthermore, the 2 digit year number fields are not only pervasive in the existing programs, but also in the existing data files and databases. That means the data files and the database schema and contents also need be changed. For on-line applications, the blackout time per se, during the data file and/or database conversion, might be unacceptable. Finally, the change from 2 digit into 4 digit could also cause problems on the user interface.

SUMMARY OF THE INVENTION

Year numbers are represented with 2 digit hybrid radix numbers, in which the higher digit is input, generated, processed, and output as hexadecimal, but displayed in a decimal-like way with font patterns 0–9 and '0–'5, while the lower digit is treated-as ordinary decimal. For application software in high level languages, such as COBOL and SQL, the method can be solely embodied in the system side, mainly in compilers, thus no change to the existing application source code other than a re-compilation is needed, and compatibility with existing data fries and databases is automatically maintained. All the data files need no change, and all the databases will continue to work with a re-compiled DBMS while no change is needed for the database schema and contents.

Solving the problem solely in the system side has many advantages. At first, the changes, no mater in hardware or in software, are much cheaper. Comparing to the cost the application software and database changes could cause, the cost for the hardware and system software changes (to embody this invention) is almost negligible. Second, but more importantly, it is much safer, because that means the effort is centralized. The hardware and/or system software (compilers and database management systems) venders can concentrate better resources into the projects, and have better quality control. Although the 2 digit year number fields are defined in the application programs, all the processing and arithmetic operations are eventually executed by the system resources. That means no one single field can bypass or escape from the system control, as long as the system hardware and software are properly designed and implemented. Third, it is much more effective, once the new hardware and/or system software are available, users need only to upgrade their hardware and system software (compilers, database management systems, etc.), and then re-compile their application programs. At last, because no change is needed for the application software and the databases, the blackout during the transition can be reduced to the minimal.

DESCRIPTION OF THE PREFERRED EMBODIMENTS

Figure 1A:
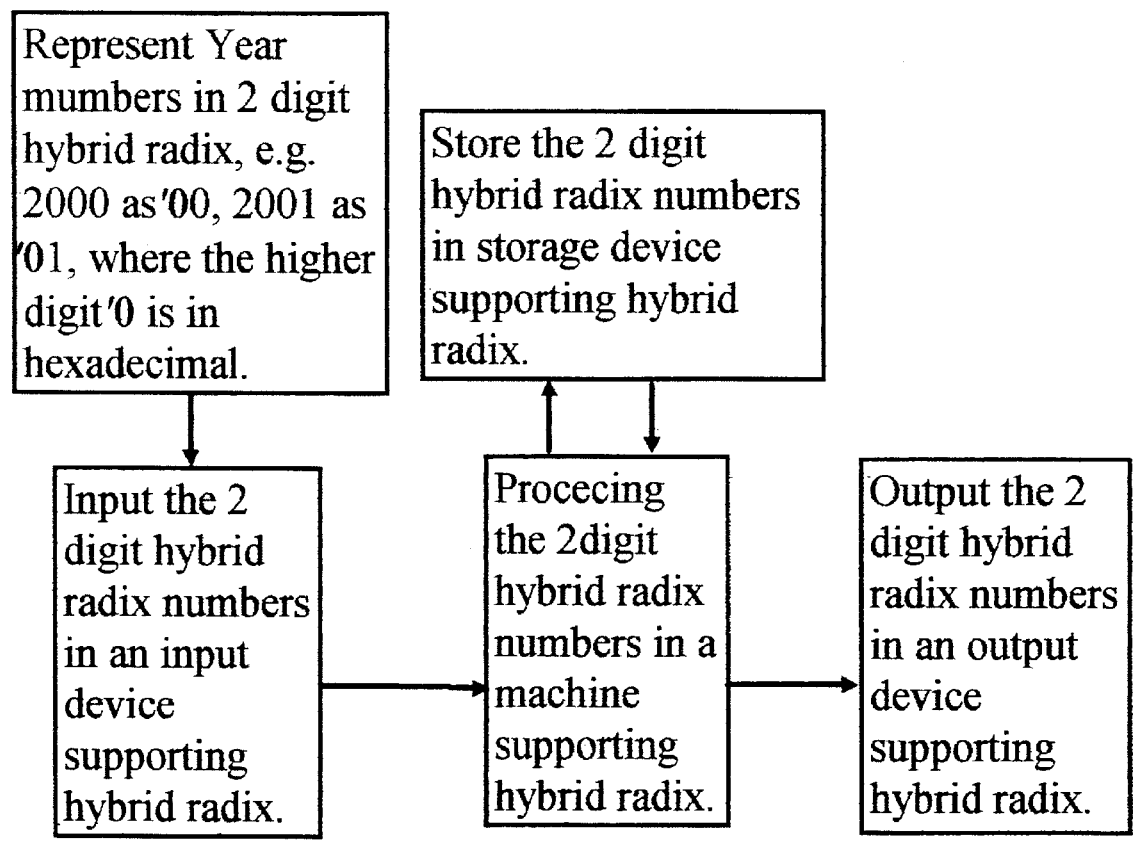
FIG. 1A illustrates a typical data flow of 2 digit hybrid radix year numbers in a data processing system, and the overall structure of this invention.

This invention solves the "Year 2000 Problem" from 3 tightly related perspectives, as illustrated in FIG. 1A.

Input/output, which involves how to input a biased (with an offset of 1900) 2 digit hybrid radix number representing a year number in the 1900–2059 range from the keyboard, and display or print out the number in a 2 digit decimal-like field. Also, how the system can generate a consistent 2 digit "current year number" after year 1999.

Storage, namely how to store a year number beyond year 1999 in a 2 digit field in the memory, in a way which is compatible to the existing software and databases.

Processing, how to apply arithmetic operations to such 2 digit fields to get correct results.

Figure 1B:
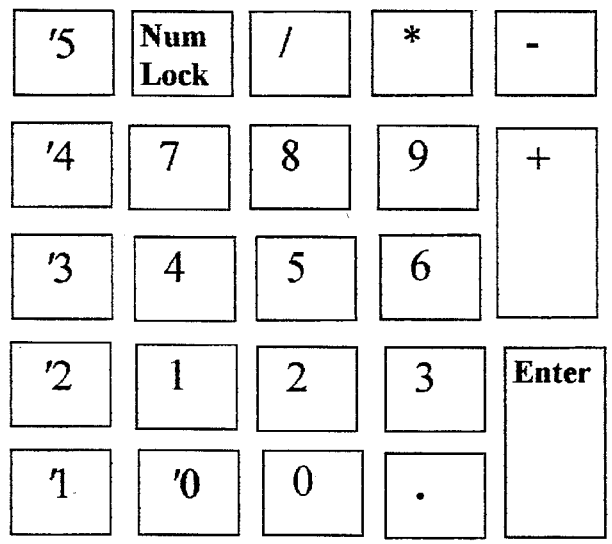
FIG. 1B illustrates a modified typical keypad of a keyboard, with 6 extra keys suitable for hybrid radix year numbers.

At first, an input device capable of inputting 2 digit hybrid radix numbers is needed. FIG. 1B illustrates a modified keyboard suitable for such hybrid radix year numbers. Six new keys, key '0,'1,'2,'3,'4, and '5, are added, each represents the first digit of a decade after year 1999. Accordingly, six new numeric font patterns are created and embodied for displaying and/or printing out. For example, key '0 will be used for a year of 200x, while key '1 will be used for a year of 201x, and the like. An alternative is to use the "shift" or other similar "meta" keys together with the ordinary numeric keys. In that case the same numeric keys 0–5 are shared to generate either digits 0–5 or digits '0–'5.

The input device, such as the modified keyboard described in FIG. 1, generates exchange codes for communication. In accordance, the central processor and the output device will accept these exchange codes. For 2 digit hybrid year numbers, six exchange codes are pre-defined to represent numbers '0 to '5.

The six particular exchange codes are chosen depending on the system, and is flexible. It could be in "escape sequence", ASCII, EBCDIC, zoned decimal, proprietary internal coding, and so forth. For example, in 8 bk ASCII, codes B0h to B5h might be used for digits '0 to '5, while 30h to 35h are used for digits 0 to 5.

In business applications, computer systems use a "packed" or "unpacked" BCD code to carry, or store, a decimal digit. In Packed BCD, 4 bits are used to represent one of the 10 possible decimal digits (0 to 9). However, 4 bits can actually be used to represent one of 16 different states, 6 states are wasted in packed BCD coding (more are wasted in unpacked BCD coding). Taking advantage of this fact, this invention uses 4-bit BCD code as hexadecimal, to carry the 6 newly added hexadecimal, but decimal-like, "digits" '0 to '5, together with the 10 ordinary decimal digits in a special way.

The use of the 6 extra states in a 4-bit BCD code is conditional, it is only applied to the second digit before the decimal point (either explicit or implicit) if this digit is the most significant digit in the number, and it follows some special procedures and arithmetic rules, which I will describe. In this way, in a 2 digit year number the first (lower) digit is in radix 10, while the second digit is in radix 16, and therefore is called a "hybrid radix" number.

The concept of hybrid radix is not new, for example in a month number the second digit is actually in radix 1. However, applying the concept to year numbers, artificially making a year number hybrid radix, which otherwise is pure decimal in common sense, leads to the solution of the "Year 2000 Problem".

Note that although 2 digit hybrid radix is specially chosen for year numbers, in a system embodying this invention all 2 digit numbers in packed or unpacked decimal are in hybrid radix, the system need not to distinguish whether a particular 2 digit number is a year number. This is because decimal is a true subset of hexadecimal, and difference exists only if the value is larger than 9 on the second digit, which in 2 digit pure decimal means overflow. In most cases there is no impact, because these pure decimal numbers are input or generated in range 0–99. However, if arithmetic operation is applied, and the programmer relies on the system to raise a size-error when the result is larger than 99, now a size error is raised only if the result is larger than 159. For example, if 76 is added to 50, the sum should be 26 together with a size-error in pure decimal. But, because the second digit is now hexadecimal, the sum will be '26 without size error. This may or may not be considered a problem if the user knows '26 is interpreted as 126. On the other hand, the result is the same if 76 is added to 90, namely a sum of 66 together with a size-error.

This is why we don't need to single out these numbers representing a year number from the application source programs, and why it is automatically compatible with existing databases and data files.

Figure 2:
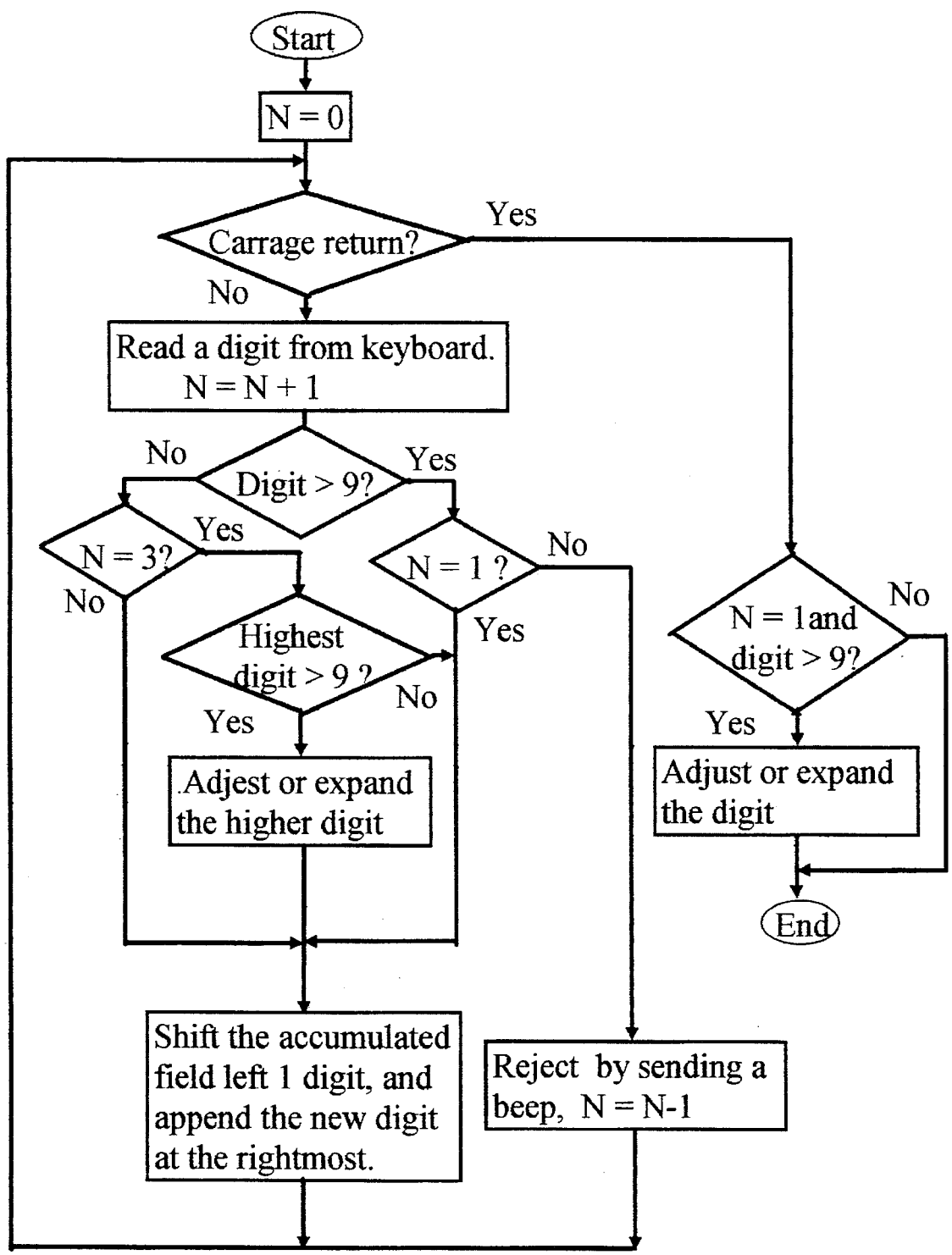
FIG. 2 is a flowchart exemplifying the special procedure applicable when a number (numeric field) is entered and stored.
Figure 3:
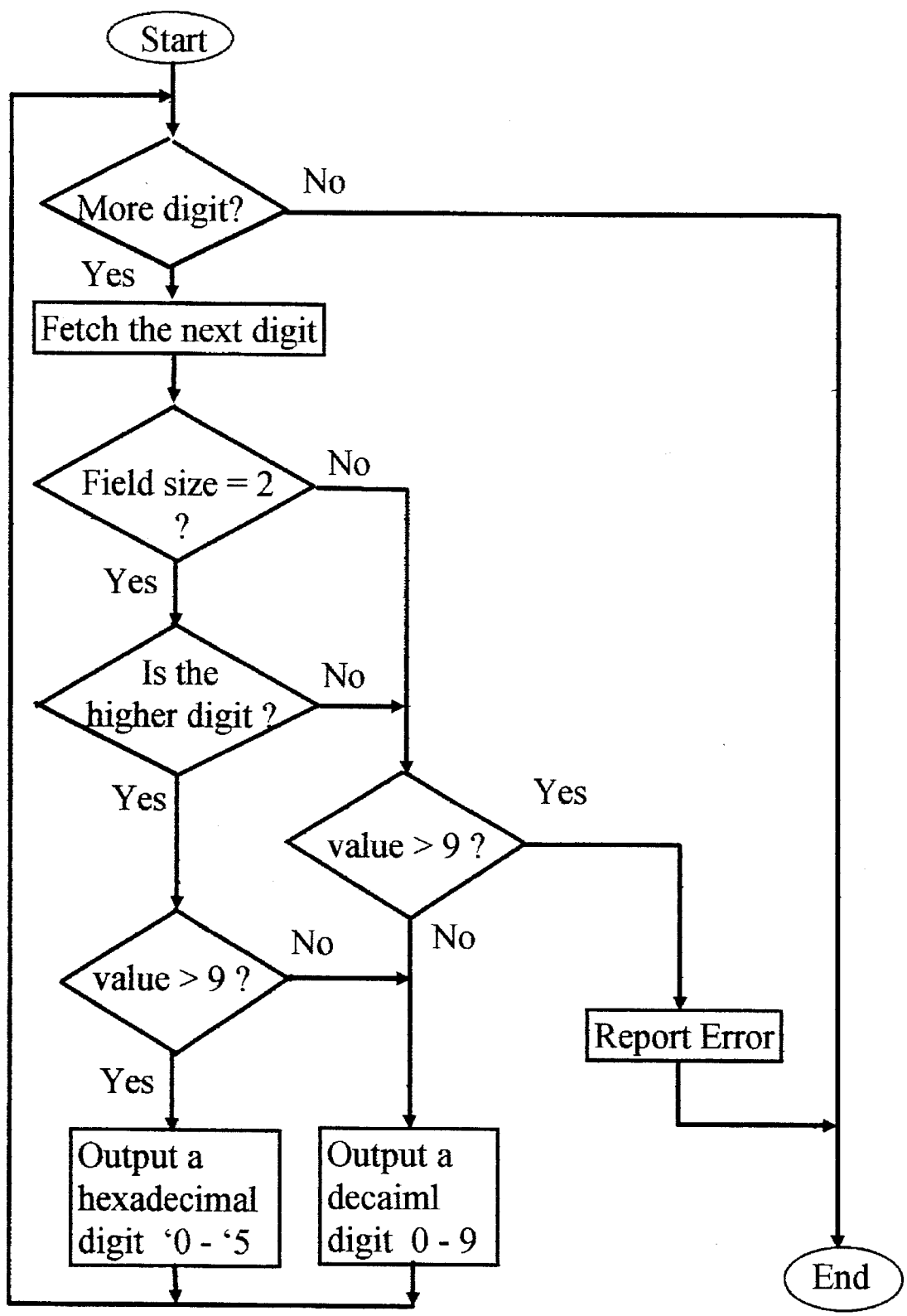
FIG. 3 illustrates the special procedure applicable when a stored 2 digit hybrid radix number is to be displayed or printed.

Special procedures apply when a number (numeric field) is entered, or to be displayed or printed which are described in FIG. 2 and FIG. 3. When a number is entered, the second digit, and the second digit only, is allowed to carry a hexadecimal value (0–9, and '0–'5) if the number is 2 digit long. If the entered number is not a 2 digit number, then the number is either rejected or adjusted. Accordingly, when a number is displayed (left to right), every digit is a normal decimal digit except the second (higher) digit of a 2 digit field which is hexadecimal.

The following examples further explain how the digits are input, stored, and interpreted.

| storage | value | output | reason |
|---|---|---|---|
| [1][2][3][4] | — | — | invalid, not a 2 digit field; |
| [3][4] | — | — | invalid, not the higher digit; |
| [1][2][3][4] | 1234 | 1234 | normal pure decimal; |
| [3][4] | 34 | 34 | the second digit is the highest digit, but is 3. |
| [3][4] | 134 | '34 | the second digit is the highest digit, and is '3. |

In summary, the special rules for the input, storage, and interpretation of the second digit before the decimal point are:

The second digit is decimal if it is not the highest digit in a field.

If the second digit is the highest digit in a field, then its value is stored and interpreted as hexadecimal, using symbols '0 to '5 to represent value 10 to 15.

Figure 4:
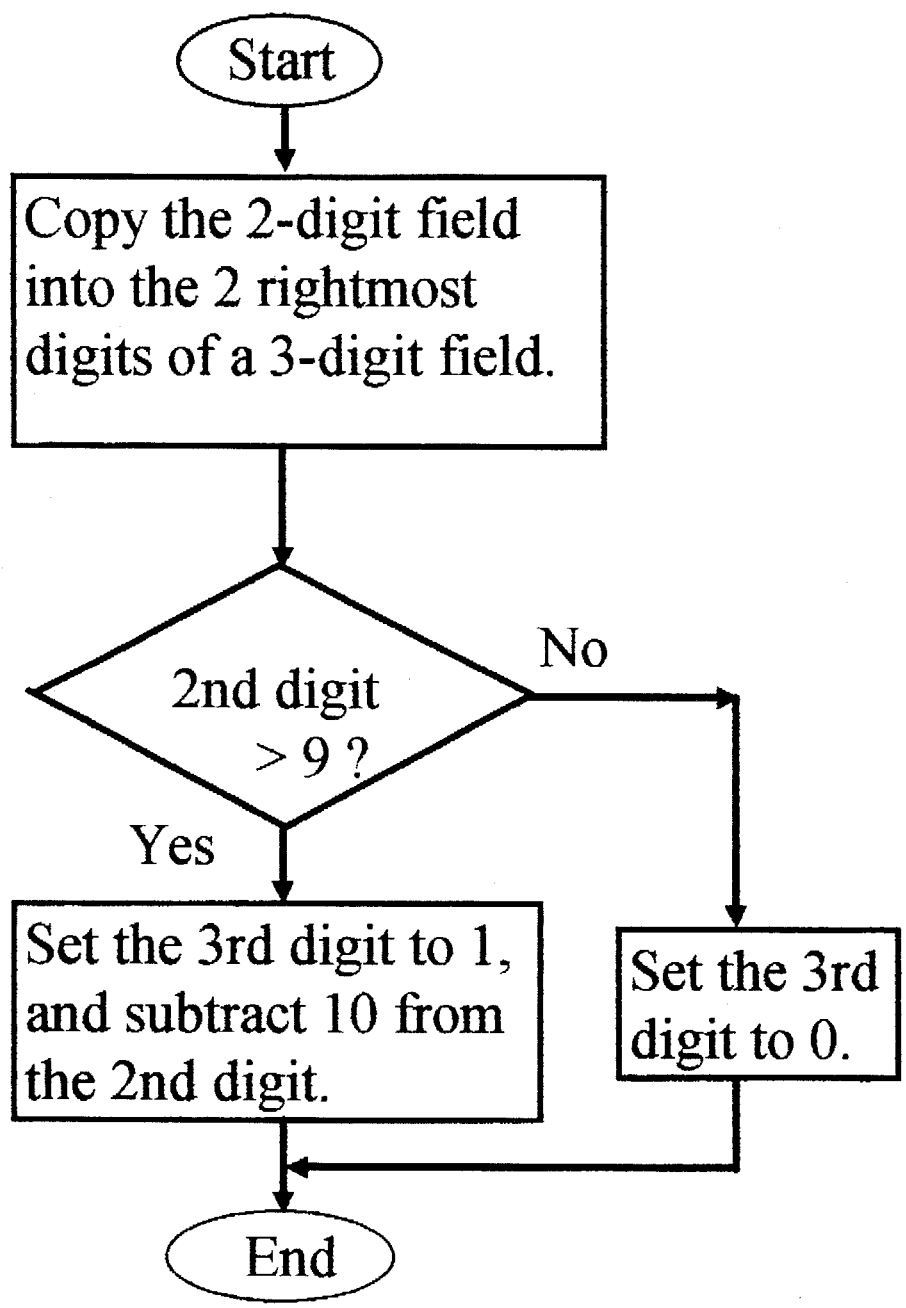
FIG. 4 illustrates how to expand a 2 digit field in hybrid radix into 3 digit pure decimal.

A 2 digit filed can be internally expanded into a 3 digit (or longer) field, which is described in FIG. 4, and is straightforward. Note that here the word "field" means a smallest logical unit of storage space. For example, a 2 digit year number is such a unit, which can not be further divided logically, although physically it can. For a date in "MM/DD/YY" format, for example, physically the whole date is carried in a 6 digit string, however the year number is carded in a 2 digit field, and therefore the second digit is in hexadecimal. Although the MM field is also 2 digit, and thus the second digit is also hexadecimal, but the existing software must already eliminated the possibilities to have a value greater than 1 on this digit.

Since the higher digit of a 2 digit number is in a different radix, we need some special procedures and rules for its arithmetic operations as well.

Figure 5:
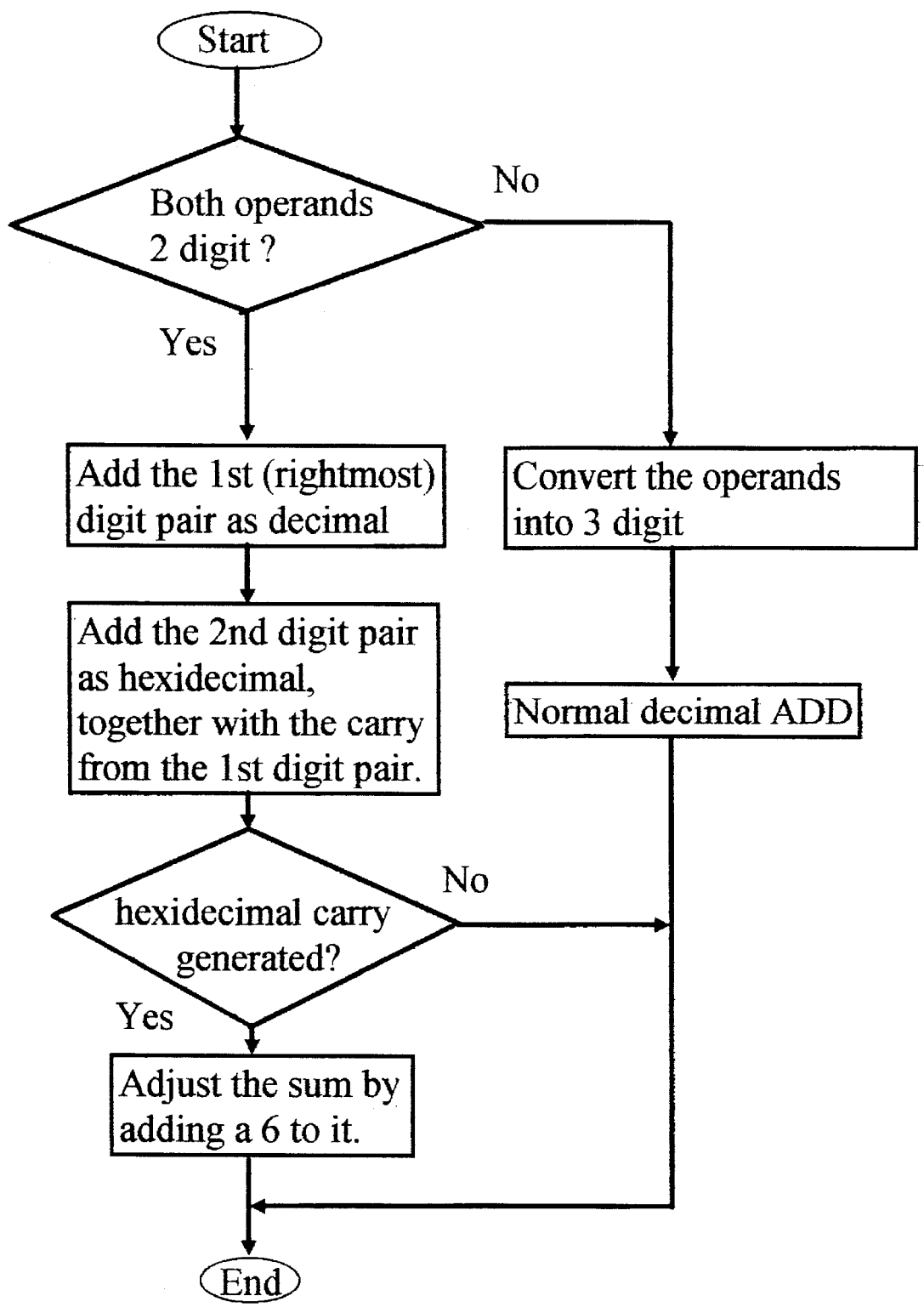
FIG. 5 is a flowchart exemplifying of a 2 digit hybrid radix ADD operation.

For an ADD operation, all digits follow ordinary decimal rules, except the second digit which follows the hexadecimal rules if and only it is the highest digit in a field. In addition, if the second digit is the highest digit, and a hexadecimal carry is generated from this digit position, then the sum is adjusted by adding a 6 to the second digit to make it consistent with pure decimal. The procedure is illustrated in FIG. 5. Following are several examples:

| Arithmetic before adjustment | 2nd digit hexadecimal | Carry from the highest digit | Adjustment | Overflow |
|---|---|---|---|---|
| 36 + 95 = '31, | Yes, | No, | No, | No; |
| 036 + 095 = 131, | No, | No, | No, | No; |
| 76 + 95 = 11, | Yes, | Yes, | 11 + 60 = 71, | Yes. |

In pure decimal, the fact a carry is generated from the highest digit indicates an overflow. Usually, like in COBOL, a "size-error" condition will be raised in such a case. For 2 digit numbers, since they are now in hybrid radix, a size-error is raised if and only if the sum is greater than 159.

Similarly, for a SUBtract operation, there is no difference if the fields are not 2 digit fields. In practice, a SUB operation is almost always reduced into add the complement of the subtrahend to the minuend. Accordingly, for a SUB operation on 2 digit fields a 15's complement is taken for the second digit, while for the first digit a 9's complement is taken. Because of this, 2 special rules are applied:

1) The result is adjusted by subtracting a 6 from the higher digit.
2) If hexadecimal carry is not generated, then the result is negative and is 100's complement is taken.

Figure 6:
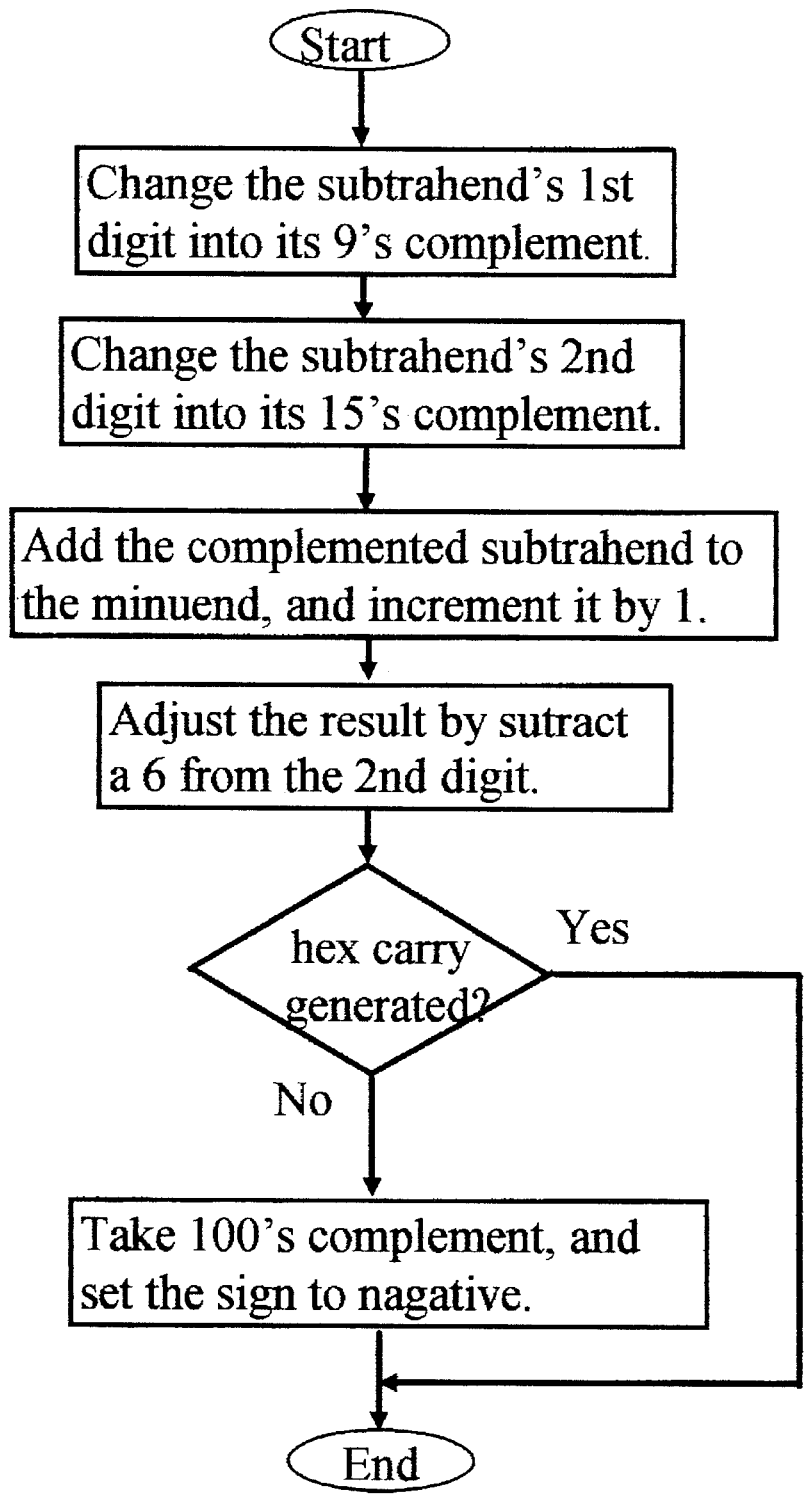
FIG. 6, and FIG. 7 are flowcharts for two alternatives of the SUB operation.

The procedure is illustrated in FIG. 6, and is applicable if both operands are 2 digit, and following are several examples:

1) 23−12=23+'47+1=71, 71−60=11;
2) 12−23=12+'36+1='49, '49−60=89, and 100−89=−11;
3) 91−72=91+87+1=79, 79−60=19;
4) 72−91=72+68+1='41, '41−60=81, and 100−81=−19;
5) '02−91=02+68+1=71, 71−60=11;
6) 91−'02=91+57+1='49, '49−60=89, and 100−89=−11;
7) 91−91=91+68+1=60, 60−60=0;

In example 1, the subtrahend 12 is changed into its complement '47, then the rules for ADD is applied, and the sum is incremented by one (as usual). Hexadecimal carry is generated because the sum on the higher digit is greater than 15, indicating the result is positive. After adjustment, the result is a positive 11.

In contrast, in example 2 no hexadecimal carry is generated, indicating the result is negative. Because of this, 100's complement is taken after the adjustment, and the sign becomes negative.

The subtraction in the adjustment step might cause confusing. As said in rule 1, a 6 is subtracted from the higher digit, and thus a 60 is subtracted from the result. This subtraction, however, is a normal hexadecimal operation without further adjustment. In other words, for each hybrid radix SUB operation, the rule is applied only once, rather than being applied recursively.

The procedure applies only if both operands are 2 digit (or less, in that case the operand or operands are expanded into 2 digit). If either the minuend or the subtrahend is longer than 2 digits, then the 2 digit one is expanded into a 3 digit buffer, and then normal decimal rules apply.

Figure 7:
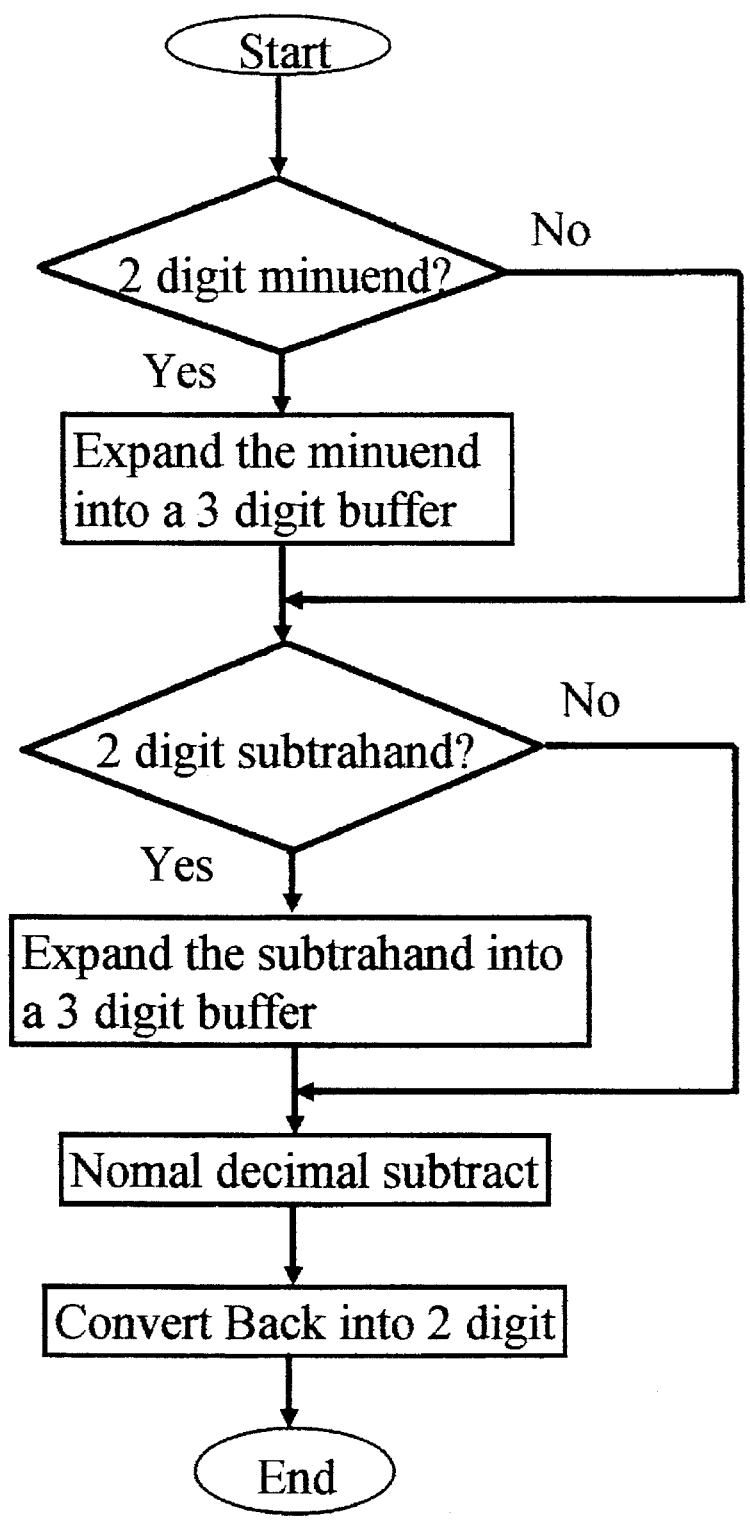

A simpler implementation, illustrated in FIG. 7, is to expand the minuend and subtrahend into two 3 digit BCD buffers first, even if both are 2 digit, then execute ordinary decimal SUB (or other arithmetic) there, and finally convert the result back into 2 digit. In this way, the expansion automatically compensated the needed adjustment after a sub operation. I did not provide a flowchart for converting back, because it is simply the reverse of the expansion: discarding the third digit (must be either a 1 or a 0) and adding a '0 to the second digit if the third digit is 1.

"Compare" is actually a SUB operation, it follows the same rules for SUB, but does not physically change the minuend.

These rules are different to either pure decimal or pure hexadecimal, and are applied conditionally, therefore it might be called "conditional hybrid radix".

I did not describe the MULTIPLY and DIVIDE operations explicitly, because they are similar, once the rules on how to interpret the second digit and how to expand are defined, the further processing is straightforward. For example, all 2 digit fields can be expanded into 3 digit buffers (FIG. 4) before a multiply or divide operation is executed.

Unpacked BCD uses 8 bits to represent a decimal digit, with the last 4 bits remaining the same as the corresponding packed BCD code. Therefore, the same rules also apply to unpacked BCD codes.

For application software written in high level languages, such as COBOL and SQL, the arithmetic procedures can be embodied purely in the system software. The flowcharts can be easily turned into codes in various languages, and can then be embodied in compilers and/or other system software (such as subroutine libraries, database management systems, etc.).

Particularly, the changes can be implemented as subroutines embedded either in the code generation potion of a compiler or in libraries, depending on the particular language. All the related input/output, processing, and arithmetic operations are translated into calls to these subroutines.

In addition, software changes are also needed in two other aspects:

1) Generating the current year number in accordance to the special rules. For example, in COBOL, the "ACCEPT FROM DATE" statement should return '00 (rather than 00) in the YY field in year 2000. The implementation for this is straightforward.

2) Allowing the six newly added digits pass the various range checks. For example, in COBOL the "IS NUMERIC" clause and other related mechanisms should recognize '0 to '5 as numeric values. Again the implementation is straightforward.

Following is an example on how to embody this invention in a COBOL compiler, by either developing a new one or modifying an existing one.

Code implementing the "ACCEPT" statement is enhanced. The input procedure, plus the keyboard changes, and the generating of 2 digit hybrid radix year numbers which is needed for "ACCEPT FROM DATE", are embodied here.

Code implementing the "DISPLAY" statement is enhanced. The output procedure, and possibly the font change as well, are implemented here.

Code implementing the "MOVE" statement is changed. The rules for expanding a 2 digit field, and the reverse, are embodied here.

Code implementing the "ADD", "SUBTRACT", "MULTIPLY", "DIVIDE", and "COMPUTE" statements are enhanced. The rules and procedures for arithmetic operations are embodied here.

Code implementing the "<", "<=", "=", ">=", and ">" operators are enhanced to adapt to the new code for SUB operation.

The definitions for NUMERIC and ALPHANUMERIC are enhanced to include the six new digits. Typically the "IS NUMERIC" clause, "IS NOT NUMERIC" clause, and the INSPECT statement will call a common routine something like is_digit( ) to do a range check, and the change is embodied here.

While this is a pure software implementation, some rules can also be implemented as hardware or firmware. In addition, while the example is for COBOL compiler, similar changes can be implemented for other programming languages, such as PL/I, and/or other system software, like database management systems, and query languages such as SQL.

In the input/output side, as described before, six new exchange codes are defined, six new keys or key combinations are added to the keyboard, and six new font patterns are added to the output device. To generate exchange code for each of these new keys, necessary circuitry or a combination of circuitry and software is also added, but which is quite simple. Similarly, to display or print out each of the new font patterns, necessary circuitry or a combination of circuitry and software is added in the output device, and which is simple again. The font patterns can be stored either in the output device, or in the host machine, depending on the particular architecture.

While my description contains many specificity's, these should not be construed as limitations on the scope of the invention, but rather as several exemplification of a few preferred embodiments thereof. Many other variations are possible. Following are several examples.

The method can be applied to unpacked BCD coding as well. Further, some systems may use special coding other than BCD, but this will not change the fact that a 4 bit field has 16 different bit combinations and of which only 10 are used to represent a decimal digit, while a 3 bit field is too small for a decimal digit. Therefore, as long as a field can be used for a decimal digit, it can also be used for a hexadecimal digit, and thus the method described in this description can be embodied.

As described earlier, the result of an ADD operation will be incorrect without adjustment if a hexadecimal carry is generated from the higher digit of a 2 digit field. However, for software relying on exception handling in which the result is ignored upon overflow, the adjustment is optional.

While most of the business application software were written in high level languages, a small potion of the existing application software might be written in assembly languages. For application software in assembly languages, although the changes can no longer be solely made in the system side, this invention can still be embodied in the application side to maintain the compatibility with the existing data files, databases, and user interfaces.

On the other hand, for some modem high level programming languages with operator overloading, such as C++, it is also viable to embody this invention in the application software, by overloading the operators (+, −, *, /, >, <, =, and so forth) with new ones which incorporate the described rules and procedures.

Also, a micro processor can be designed to embody the arithmetic rules in the ALU hardware, either hard wired or micro-coded, and either as new instructions, or as a revised version of the old instructions. A BCD adder typically consists of two 4-bit binary (hexadecimal) adders and a decimal carry generator. To implement the special rules for the second digit, only minor changes are needed: using the field size to select either the decimal carry or the hexadecimal carry, and the result adjustment circuitry.

Further, while the invention can be embodied on general purposed computers, it can also be embodied on special purposed computers or other apparatus with microprocessors, such as Point-Of-Sale machine, and so forth.

Accordingly, the scope of the invention should be determined not by the embodiments illustrated, but by the append claims and their legal equivalents.

I claim:

1. A method for using 2 digit "hybrid radix" numeric fields for inputting, generating, storing, processing, and outputting year numbers ranging from 1900 to 2059 in a data processing system, comprising the steps of:

a) representing a 4 digit decimal year number with a biased 2 digit hybrid radix year number, with a hexadecimal most significant digit and a decimal least significant digit, and;

b) inputting the higher digit of a 2 digit hybrid radix year number in hexadecimal, from an input device capable of entering 2 digit hybrid radix numbers, and storing the digit in the most significant digit position of a 2 digit numeric field in hexadecimal, and inputting the lower digit of the number in decimal, and storing the digit in the least significant digit position of said 2 digit numeric field, and optionally;

b') whenever necessary, generating such a 2 digit hybrid radix year number, and storing the generated number in a 2 digit numeric field, and optionally;

c) whenever a computational operation is to be applied to a stored 2 digit hybrid radix number, applying hexadecimal arithmetic rules to the most significant digit, and applying decimal arithmetic rules to the least significant digit, and;

c') alternatively, whenever a computational operation is to be applied to a stored 2 digit hybrid radix number, expanding the number into 3 digit decimal first, then applying decimal arithmetic rules to all the digits and converting the result back into 2 digit, and optionally;

d) whenever necessary, outputting the stored 2 digit hybrid radix year number to an output device capable of displaying or printing 2 digit hybrid radix numbers, with the higher digit in hexadecimal and the lower digit in decimal, and;

e) providing a central processor to carry out said operations, whereby a compatibility with the 2 digit pure decimal year numbers used in the existing data files, database records, software, and user interface, can be maintained after year 1999.

2. The method of claim 1 is embodied in a data processing machine with means for inputting, outputting, storing, and computing 2 digit hybrid radix year numbers ranging from 1900 to 2059.

3. The method of claim 1 wherein the step of inputting is embodied in an input device with means for inputting 2 digit hybrid radix year numbers.

4. The method of claim 1 wherein the step of outputting is embodied in an output device with means for displaying or printing 2 digit hybrid radix year numbers, with the higher digit in predetermined visible decimal-like font patterns containing a recognizable pattern of its decimal counterpart.

5. The output device of claim 4 is used along with an input device.

6. The method of claim 1 wherein the step of storing is embodied in a storage device with means for storing and retrieving 2 digit hybrid radix year numbers.

7. The storage device of claim 6 is used along with an input device.

8. The storage device of claim 6 is used along with an output device.

* * * * *